United States Patent
Knoop (10) Patent No.: US 10,378,511 B2
(45) Date of Patent: Aug. 13, 2019

(54) YAW ADJUSTMENT OF A WIND TURBINE

(71) Applicant: Wobben Properties GmbH, Aurich (DE)

(72) Inventor: Frank Knoop, Aurich (DE)

(73) Assignee: Wobben Properties GmbH, Aurich (DE)

(*) Notice: Subject to any disclaimer, the term of this patent is extended or adjusted under 35 U.S.C. 154(b) by 422 days.

(21) Appl. No.: 15/308,350

(22) PCT Filed: Apr. 23, 2015

(86) PCT No.: PCT/EP2015/058756
§ 371 (c)(1),
(2) Date: Nov. 1, 2016

(87) PCT Pub. No.: WO2015/169605
PCT Pub. Date: Nov. 12, 2015

(65) Prior Publication Data
US 2017/0051722 A1 Feb. 23, 2017

(30) Foreign Application Priority Data

May 6, 2014 (DE) .................. 10 2014 208 468

(51) Int. Cl.
*F03D 7/02* (2006.01)
*F03D 80/50* (2016.01)
(Continued)

(52) U.S. Cl.
CPC ........... *F03D 7/0204* (2013.01); *F03D 1/065* (2013.01); *F03D 80/50* (2016.05); *F03D 80/70* (2016.05);
(Continued)

(58) Field of Classification Search
CPC ........ F03D 7/0204; F03D 1/065; F03D 80/70; F03D 80/88; F03D 80/50; Y02E 10/721; Y02E 10/726; Y02E 10/723
See application file for complete search history.

(56) References Cited

U.S. PATENT DOCUMENTS 7,958,797 B2   6/2011 Aust et al.
9,447,776 B2 * 9/2016 Munk-Hansen ...... F03D 1/0658
(Continued)

FOREIGN PATENT DOCUMENTS

CN    102792019 A    11/2012
CN    103502635 A    1/2014
(Continued)

*Primary Examiner* — Eldon T Brockman
(74) *Attorney, Agent, or Firm* — Seed Intellectual Property Law Group LLP (57) ABSTRACT

An adjusting device for adjusting a yaw position of a nacelle of a wind turbine, comprising a circumferential holed flange provided with drilled holes, and at least one adjusting means, having a gripping portion for gripping on the holed flange, a fastening portion for fastening to an anchorage point of the wind turbine, and a linear drive for exerting a linear movement between the gripping portion and the fastening portion, wherein the holed flange is fixedly connected to the nacelle, and the anchorage point is fixedly connected to stationary part of the wind turbine, in particular a wind turbine tower, or vice versa, and the nacelle is mounted so as to be rotatable relative to this stationary part of the wind turbine, such that the holed flange and the anchorage point can also execute a rotational movement relative to each other, such that a linear movement exerted between the gripping portion and the fastening portion by the linear drive effects a rotational movement between the holed flange and the anchorage point, and thereby effects a yaw adjustment of the nacelle, wherein the gripping portion has at least one movable fixing pin for engaging in respectively one of the drilled holes of the holed flange, in order thereby to fix the gripping portion to the holed flange in a releasable manner.

21 Claims, 6 Drawing Sheets

(51) Int. Cl.
    *F03D 80/70*     (2016.01)
    *F03D 80/80*     (2016.01)
    *F03D 1/06*     (2006.01)

(52) U.S. Cl.
    CPC ............ *F03D 80/88* (2016.05); *Y02E 10/721* (2013.01); *Y02E 10/723* (2013.01); *Y02E 10/726* (2013.01)

(56) References Cited

U.S. PATENT DOCUMENTS

| | | | |
|---|---|---|---|
| 9,464,625 B2 | 10/2016 | Brenner et al. | |
| 2011/0156405 A1 | 6/2011 | Holm | |
| 2012/0308398 A1 | 12/2012 | Agardy et al. | |
| 2013/0149146 A1* | 6/2013 | Sasseen | F03D 7/0204 416/1 |
| 2014/0110949 A1* | 4/2014 | Brenner | H02K 7/1838 290/55 |
| 2014/0224048 A1* | 8/2014 | Munk-Hansen | F03D 1/0658 74/142 |
| 2014/0377062 A1 | 12/2014 | Jakobsen et al. | |

FOREIGN PATENT DOCUMENTS

| | | |
|---|---|---|
| CN | 104234928 A | 12/2014 |
| DE | 102011017801 A1 | 10/2012 |
| EP | 0754881 A2 | 1/1997 |
| EP | 0952337 B1 | 3/2003 |
| EP | 1659286 A1 | 5/2006 |
| KR | 101346178 B1 | 12/2013 |
| WO | 2010029210 A1 | 3/2010 |

\* cited by examiner

YAW ADJUSTMENT OF A WIND TURBINE

BACKGROUND

Technical Field

The present disclosure relates to an adjusting device for adjusting a yaw position of a nacelle of a wind turbine, and it relates to an adjusting means for use in such an adjusting device. Furthermore, the disclosure relates to a wind turbine having an adjusting device for adjusting a yaw position of the nacelle, and it relates to a method for adjusting a yaw position of a nacelle.

Description of the Related Art

Adjusting devices for adjusting the yaw position of a nacelle of a wind turbine are known. For this purpose, many standard devices use a plurality of adjusting drives, which engage in a ring gear by means of a pinion and can thereby provide the yaw adjustment. Following attainment of a new yaw position, the latter can be fixed in that the drives are stopped and partially tensioned against each other in order thereby also to preclude any problems of a gear clearance between the pinion and ring gear. In this case, there may be the problems of wear between the drive pinion and the ring gear, and of the work required, and the fault susceptibility, in proving lubrication here.

Hydraulic systems are also known, such as, for example, from the international application WO2010/029210. The latter describes a hydraulic system that comprises a plurality of hydraulic units, which each have a cylinder piston having a brake shoe system. The brake shoe system grips on a flange, in order basically to fix this brake shoe system there, in order then to actuate the hydraulics, and thereby move this brake disc ring and a nacelle that is connected thereto. The reliability of the yaw adjustment and, moreover, also holding of the nacelle in a selected yaw position also depends substantially on the quality, at least functional capability, of this brake shoe system.

The document EP0952337 B1 likewise relates to a hydraulic system, in which a plurality of force transmission elements act on a ring gear, against which they are pressed from the inside. Accordingly, similar problems may occur here in connection with the ring gear and the counter-elements acting thereon, as in the case of the yaw adjustment described above, by means of pinions and a matched ring gear. Moreover, the solution of this latter document requires both an actuator for pressing the force transmission element against the ring gear, and for exerting the actual movement. Insofar as any tensile force at all can also be exerted upon the ring gear, such a tensile force, however, acts against the pressing force with which the force transmission element is pressed against the ring gear.

Consequently, in this case problems of the hydraulic drives are unnecessarily combined with the problems of the use of a ring gear.

BRIEF SUMMARY

Embodiments are directed to a yaw adjustment that can be realized in a manner that is as reliable, simple and space-saving as possible, and/or as inexpensive as possible. At least, a solution is to be proposed that is an alternative to that known hitherto.

In the priority application relating to the present PCT application, the German Patent and Trade Mark Office has searched the following prior art: EP 0 754 881 A2.

An adjusting device comprises a holed flange, having drilled holes, and at least one adjusting means. The adjusting means comprises a gripping portion, which can grip on the holed flange. The adjusting means also comprises a fastening portion, by means of which it can be fastened to an anchorage point of the wind turbine. Finally, the adjusting means comprises a linear drive, for exerting a linear movement between the gripping portion and the fastening portion. The holed flange and the anchorage point can consequently be moved relative to each other. Accordingly, the holed flange is fixedly connected to the nacelle, and the anchorage point is fixedly connected to the tower of the wind turbine, or vice versa. Accordingly, the nacelle is mounted so as to be rotatable relative to the tower. For this propose, a bearing is provided, which, in particular, is provided as a ball-bearing slewing ring. The bearing may also be designated as a yaw bearing. The adjusting means can thus initiate a linear movement between the holed flange and the fastening portion, and consequently between the nacelle and the tower, or between the tower and the nacelle. This is effected by the linear drive, which initiates the corresponding movement between the gripping portion and the fastening portion, and thereby, when the gripping portion grips fixedly on the holed flange, initiates the movement between the nacelle and the tower. For this purpose, particularly preferably, the holed flange is fastened to a part of the ball-bearing slewing ring, in particular in a region in which a ring gear would otherwise be provided. Such a ring gear is thus dispensed with, or replaced by the holed flange. Moreover, a holed flange is easier to produce and less susceptible to wear.

The movement can be initiated when the gripping portion grips fixedly on the holed flange, and for this purpose the gripping portion has a movable fixing pin. The latter can engage in one of the drilled holes of the holed flange, in that it is inserted in the corresponding drilled hole. The fixing pin may be cylindrical or slightly conical in form.

Basically, therefore, the adjusting means is fastened in a permanent manner—but possibly, for example, in a pivotable manner—to the anchorage point. The adjusting means can be fastened temporarily to the holed flange, such as via the gripping portion, namely, only when the movable fixing pin engages in a drilled hole of the holed flange. Moreover, for example, a plurality of fixing pins could also be provided.

Thus, when the gripping portion has been fixed to the holed flange, the yaw movement can be effected and, by release of the path of a fixing pin, for the purpose of displacing the gripping portion, the latter can likewise be released from the holed flange, at least to the extent that it can be displaced along the holed flange.

A further resultant advantage is that the mountings, particularly at the anchorage point, do not have to be set so precisely; setting can be effected via the adjusting means.

The gripping portion and/or the fastening portion may each be connected to the linear drive via a ball-bearing slewing ring.

Preferably, the linear drive is realized as a hydraulic linear drive. A drive can consequently exploit the advantages of a hydraulic drive, namely, in particular, the property of being able to apply large linear forces. Further advantages are to be described below. The movable fixing pin enables the respective gripping portion to be shifted, thereby also enabling the yaw position to be altered, not only within a limited angular range. As a result of sufficiently frequent shifting, the wind turbine can thereby be moved by 360° in its yaw position.

Preferably, the holed flange has a full-perimeter guide portion. This may be, for example, a full-perimeter rail or a full-perimeter groove or a full-perimeter projection. For this purpose, the gripping portion has a running portion matched to this full-perimeter guide portion. The gripping portion may thus have, for example, a groove portion that, in size and shape, matches a full-perimeter projection of the holed flange. If the fixing pin is then released, an actuation of the linear drive no longer results in a movement of the holed flange relative to the anchorage point, but to displacement of the gripping portion along the holed flange. In this case, particularly, a hydraulic linear drive also enables a position to be set with great precision. In particular, the gripping portion is thereby displaced into a new position along the holed flange, in which it can engage, by means of the fixing pin, in another drilled hole and is thereby fixed at a new position on the holed flange.

Displacement of this gripping portion can thus be effected in a simple manner. Since the fixing is effected by means of at least one fixing pin in a drilled hole, this fixing of the gripping portion to the holed flange is also able to absorb tensile and shear forces. The fixing can be achieved substantially without play, and wear can likewise be virtually precluded, or at least greatly limited in extent.

A further embodiment proposes that the drilled holes of the holed flange be lined with hardened sleeves. This enables any remaining, or at least possible, wear to be further reduced. In this case, such a hardened sleeve is particularly easily inserted in a drilled hole, such as a drilled hole in the holed flange.

According to one design, the hydraulic linear drive is controlled by means of control valves. Via these control valves, the hydraulic fluid is supplied to or drawn off from a hydraulic cylinder, in order thereby to effect the linear movement between the gripping portion and the fastening portion. Closing of the control valves results in the movement of the linear drive being suppressed accordingly. As a result, the nacelle can be held in its current yaw position. It is therefore possible to ensure that the nacelle is held in a durable manner in its current yaw position, virtually without expenditure of energy. Particularly if the control valves are even self-closing, this holding can be effected without expenditure of energy.

Clearly, for this purpose, the respective gripping portion must also grip on the holed flange. Here, also, the fixing pin, or a corresponding movement mechanism, may be realized such that its rest position is that at which it engages in a drilled hole of the holed flange.

Even if, according to another embodiment, a linear drive other than a hydraulic linear drive is used, for example an electric linear drive, the linear drive may be realized so as to be self-locking. For example, a spindle drive, or a worm drive having a slight pitch, is usually self-locking. It is thereby also possible for a current yaw position of the nacelle to be held in a simple manner, preferably without being permanently controlled.

Preferably, the linear drive is provided with a damping system. This is important, in particular, for the state in which the nacelle is held in its yaw position. In the case of a gust, especially also resulting in a torsional moment upon the nacelle, about the tower axis, such a damping system, namely having an elasticity with damping, can to a certain extent yield to such a torsional moment and thereby avoid load peaks.

Such a damping system comprises a bypass opening for the hydraulic fluid, especially in the case of use of a hydraulic linear drive. As a result, the hydraulic fluid can divert, at least a little, through such a bypass, and thereby yield to a force upon the cylinder, particularly caused by a torsional moment described above. In particular, the size of such a bypass, and the adjoining hydraulic system, may influence the size and type of the elasticity and its damping.

Such a described bypass for the hydraulic oil may preferably be provided in the plunger of the hydraulic linear drive, i.e., in the plunger that is moved in the respective hydraulic cylinder.

Preferably, four adjusting means are provided, or a multiple of four. In the case of four adjusting means, the adjusting device is prepared such that, for the purpose of adjusting the yaw position, respectively two adjusting means are fixed with their gripping portions on the holed flange, i.e., are in engagement, while the other two are shifted with their gripping portions from one hole position to another. Since there are thus always two, or at least two, adjusting means in engagement in each case, it is possible to achieve an adjustment that is as symmetrical as possible, i.e., a symmetrically distributed action of forces.

It is also made possible, basically, to effect shifting in a flying manner. This is because it is possible to effect control such that the adjusting means that are not just then in engagement in each case are actively moved into a new position, i.e., such that their gripping portions can each engage at a new position on the holed disc. In this case, this shifting is effected such that the fixing by means of the fixing pins is also effected during the movement, i.e., as a change in the yaw position is occurring. For this, a synchronization of the movements may be provided, in that the adjusting means that are just then to be shifted synchronize with the others such that their gripping portions move concomitantly with the holed flange, i.e., are stationary relative to the holed flange. These newly displaced gripping portions can then be fixed to the holed flange by means of the fixing bolts, and they can then take over the movement, i.e., the displacement. A change-over thus occurs, between the adjusting means that have just shifted and now take over the yaw adjustment, and the adjusting means that, until then, have effected the yaw adjustment and can now be released by their fixing pins, in order to be shifted accordingly.

In this way, by means of this flying change-over, between adjusting means that are engagement and those that are not in engagement, it is possible to achieve a continuous yaw adjustment.

Nevertheless, it is also possible, however, to effect at least a discontinuous yaw adjustment with only a single adjusting means. In this case, however, there would also be a need for a further fixing means that can arrest the holed flange, relative to an anchorage point, while the one adjusting means is shifted.

Preferably, the adjusting device is prepared such that at least one of the linear drives is operated, at least upon attaining a new yaw position, such that it builds up a tension, in order thereby to avoid a play, or a clearance in the sense of a gear clearance, between the holed flange and the anchorage point.

Thus, when a desired yaw position is attained temporarily, at least one adjusting means exerts a force, for adjusting the yaw position, that is directed against another adjusting means, in particular one that is already in a holding position.

A further embodiment is characterized in that for each adjusting means there is a measuring means for effecting a longitudinal measurement of an adjusting cylinder of the adjusting means. In particular, this longitudinal measurement enables a drilled hole of the holed flange to be found, in order then to fix the gripping portion by means of the fixing pin. Additionally or alternatively, the measuring means may also be used to deduce the yaw position. If the controller that is used has the information concerning which drilled hole the respective gripping portion has just been fixed in, ultimately the yaw position of the nacelle can also be detected very precisely from the position measurement of the adjusting means. For the purpose of detecting the drilled hole of the holed flange that is currently being used in each case, an identification may be provided on the holed flange, and/or the controller may record, or at least evaluate, the performed movement operations in order to identify the current drilled hole in each case. Additionally or alternatively, for the purpose of finding a drilled hole, a corresponding sensor is proposed, which is arranged, in particular, on the gripping portion and which can identify a drilled hole, for example by means of a distance measurement or metal identification.

Preferably, the individual drilled holes of the holed flange, and/or their positions, are thus identified, in order to determine therefrom the current yaw position of the nacelle. Such an identification may be effected by an optical or electronic identification, such as an RFID chip.

According to one design, it is proposed that there be an information connection for transmitting information between the adjusting means. This connection may preferably be realized via a central control unit, or the adjusting units communicate directly with each other, as, for example, via a ring network architecture. The latter may also be used to coordinate the tasks of which adjusting unit is just then in engagement and altering or holding a yaw position, and which adjusting unit is currently shifting its position on the holed flange. Special communication is accordingly proposed for the procedure, described above, of a flying change-over between the adjusting means that are in engagement and those that are being displaced.

According to a further embodiment, it is proposed that each gripping portion have at least two fixing pins for engaging in correspondingly two drilled holes. As a result, not only can the gripping portion be fixed in the circumferential direction on the holed flange but, owing to the fixing by means of at least two fixing pins, in two drilled holes, a tilt stability can also be achieved. This has the result that the guide portion, i.e., a guide groove, guide rail or the like, only has to guide the gripping portion during its displacement, while at the same time avoiding the need for this guide portion to absorb tilt forces upon the gripping portion, namely, from a tilting of the gripping portion about a longitudinal axis of its fixing pin.

One design of the adjusting device provides that the gripping portion grips around an outer perimeter of the holed flange and is arranged so as to be displaceable along this outer perimeter. The adjusting device is thus realized to provide the gripping portion, and accordingly also the linear drive and the fastening portion, radially outside of the holed flange. As a result, any space inside the holed flange, i.e., in particular the interior of the tower, can remain free. This creates a solution that occupies scarcely any space. This can also be rendered possible, in particular, in that a holed flange is provided, having drilled holes that are gripped by the gripping portion, and thus by the adjusting means. Since the fastening in such drilled holes enables a force, i.e., in particular a tensile force and shear force, to be transmitted equally in each direction, such an arrangement in the radially outer region of the holed flange is easily realized by means of the proposed solution.

Preferably, for this purpose, the full-perimeter guide portion is likewise arranged on the perimeter, or at least in the region of the perimeter, namely, between the drilled holes and the radial outer perimeter, i.e., radially outside of the full-perimeter series of drilled holes.

Additionally proposed is a wind turbine comprising a tower and, rotatably mounted thereon, a wind turbine nacelle. An adjusting device, according to at least one of the embodiments described above, is used to adjust the yaw position of the nacelle. Accordingly, the wind turbine can be improved, in respect of the yaw adjustment, by the use of such adjusting devices, and in particular can be realized so as to be less expensive and more reliable.

Additionally proposed is an adjusting means having the features that have been described for the adjusting means, at least above in connection with at least one embodiment of the adjusting device. The adjusting means thus has a gripping portion, a fastening portion and, arranged between them, a linear drive, and these elements behave as has been described above in connection with at least one embodiment of the adjusting device. Preferably, the adjusting means also have a communication unit, or a connection to such a communication unit, to enable the coordinations described above to be effected.

Preferably, the wind turbine is characterized in that the holed flange is fastened, in particular screw-connected, to a tower shaft of the tower or to the yaw bearing, in particular to a ball-bearing slewing ring, and extends radially outwards from there. The wind turbine can consequently have the adjusting means arranged outside of the tower, but this may be inside a nacelle casing, and consequently a highly space-saving solution can be created. Additionally or alternatively, the drilled holes of the holed flange are arranged radially outwardly in relation to the tower or in relation to the yaw bearing. The drilled holes thus in total constitute a full-perimeter series of holes around a common central point, and this series of holes is outside of the tower and/or outside of the yaw bearing, in relation to a radial direction at this level of the tower. This likewise provides a space-saving arrangement, in which the adjusting means are provided radially on the outside.

Additionally proposed is a method for adjusting a yaw position. This method uses an adjusting device according to at least one of the described embodiments, and/or it uses an adjusting means as described above. The method comprises the steps a) actuating at least one first adjusting means that is engagement with the holed flange, such that there results a movement between the holed flange and the anchorage point, and consequently a yaw adjustment of the nacelle, b) shifting at least one further adjusting means, respectively, from one drilled hole to another drilled hole of the holed flange, c) actuating the at least one further adjusting means that is now in engagement with the holed flange, such that there results a further rotational movement, between the holed flange and the anchorage point, and consequently a further yaw adjustment of the nacelle, d) shifting the at least one first adjusting means, respectively, from one drilled hole into another drilled hole of the holed flange, and e) repeating the steps a) to d), until the nacelle has attained its desired yaw position, or, f) as an alternative to the steps b) and c), fixing the holed flange in position by at least one other fixing device, and, g) as an alternative to step e), repeating the steps a), f) and d), until the nacelle has attained its desired yaw position.

Thus, an adjusting means that is engagement with the holed flange is actuated. This produces a rotational movement between the holed flange and the anchorage point, and consequently the yaw adjustment. Basically, it is immaterial whether the holed flange is stationary, i.e., is connected to the tower, and the anchorage is movable, i.e., connected to the nacelle, or whether the holed flange is movable with the nacelle, and the anchorage point is fixedly fastened to the tower. What is crucial is that a relative movement is achieved, such that the nacelle can be adjusted thereby in its yaw position.

Then, or during the latter, a further adjusting means, which just then is not in engagement, is shifted on the holed flange. These shifts are effected such that the adjusting means, namely, its gripping portion, is released from the corresponding drilled hole by corresponding release of the fixing pin. The gripping portion in this case is not released completely, but only such that it is free of the corresponding drilled hole, but can move in a guided manner along the holed flange, namely, along a full-perimeter rail, a full-perimeter groove, or similar guide means. The gripping portion is thus to that extent released, and the actuation of its linear drive results in it then being displaced along the holed flange. Additionally or alternatively, displacement along the holed flange is also effected in that another adjusting means displaces the nacelle in its yaw position, i.e., there is a relative movement between the holed flange and the anchorage points.

In any case, the gripping portion is displaced along the holed flange and fixed in a new drilled hole. This at least one adjusting means, shifted thus, can now take over the exerting of the rotational movement. By means of its linear drive, this adjusting means thus exerts a force upon the holed flange, and thereby takes over the adjusting of the yaw position.

The adjusting means that was initially in engagement, and that had effected the alteration of the yaw position, can now be shifted. For the change-over, it may be advantageous to short-circuit the hydraulic circuits of the linear drives, if the latter are hydraulic, in order that force is kept small during bolting-in and unbolting.

These steps, according to which one adjusting means is at least in engagement and another adjusting means is displaced, and these adjusting means basically exchange their functions, following a partial displacement, are repeated accordingly.

Alternatively, however, adjustment could also be effected with only one adjusting means. For this, only this one adjusting means would effect the movement of the yaw position. In order for shifting to be effected, the holed flange would then have to be fixed to the anchorage point by an additional means. Such an additional means could correspond, for example, to an adjusting means having a gripping portion, but without an active drive. Basically, there would thus only be the gripping portion that is fixed, by means of a fixing pin, for shifting the adjusting means and able to hold the yaw position until the adjusting means has been shifted.

Preferably, at least one of the linear drives is operated, at least upon attaining a new, desired yaw position in each case, such that it builds up a tension. This one linear drive, i.e., the one respective adjusting means, thus builds up a force against another adjusting means, and can thereby avoid gear clearance, or gear play, or, analogously, a minimal play between the fixing pins and drilled holes.

BRIEF DESCRIPTION OF THE SEVERAL VIEWS OF THE DRAWINGS

The disclosure is now described in greater detail, on the basis of examples and with reference to the accompanying figures.

DETAILED DESCRIPTION

Figure 1:
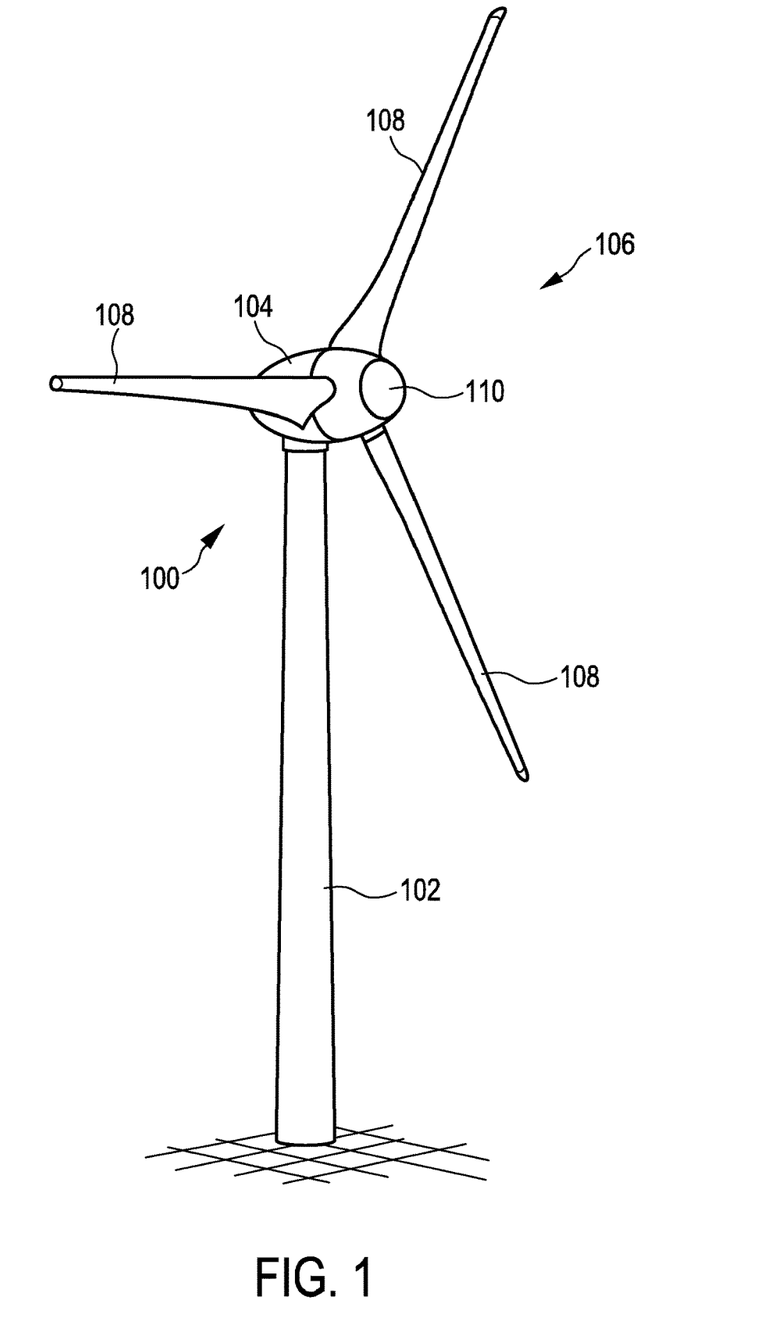
FIG. 1 shows a wind turbine, in a perspective view.

FIG. 1 shows a wind turbine 100 having a tower 102 and a nacelle 104. A rotor 106, having three rotor blades 108 and a spinner 110, is arranged on the nacelle 104. When in operation, the rotor 106 is put into a rotary motion by the wind, and thereby drives a generator in the nacelle 104.

Figure 2:
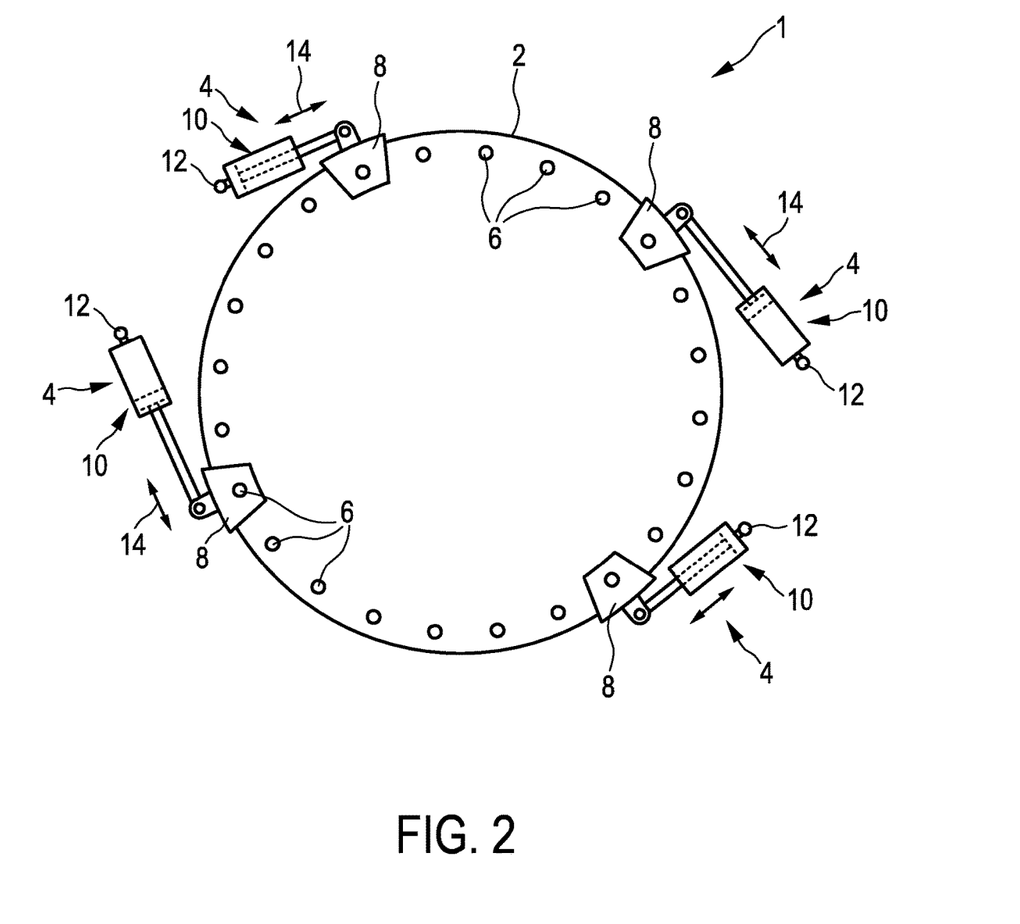
FIG. 2 shows, in highly schematic form, an adjusting device, according to a first embodiment.

The adjusting device 1 of FIG. 2 is represented therein in a highly schematic top view, showing a holed flange 2 and four adjusting means 4. The holed flange 2 has a multiplicity of drilled holes 6. The holed flange 2 in this case is connected in the proper manner to the fixed part of the yaw bearing, and the yaw bearing may be realized, particularly preferably, as a ball-bearing slewing ring. The holed flange 2 in this case may have a large central opening, through which it is even possible for persons to climb, in order to pass from the tower to high in the nacelle, which, however, is not represented here, for reasons of simplicity.

Each adjusting means 4 sits with a gripping portion 8 on the holed flange 2, and can be fixed to one of the drilled holes 6 by means of a fixing pin. The gripping portion 8 may also be designated as a "shoe", and the fixing by means of a fixing pin may also be designated as "bolting", namely by means of a bolt that is introduced axially into the respective drilled hole 6. For this purpose, the gripping portion, or shoe, comprises a bolting means, or an automatic bolting means, that can effect the bolting as autonomously as possible.

Each adjusting means 4 thus has a gripping portion 8, a linear drive 10 and a fastening portion 12. The fastening portion 12 is fastened to the mainframe of the nacelle. As a result of actuation of the linear drive 10, a force and movement between the gripping portion 8 and the fastening portion 12 can thus be exerted. The fastening portion 12 is thus thereby displaced relative to the gripping portion 8. In the case of the embodiment shown, the fastening portion 12 is to be fastened to the mainframe, and actuation of the linear drive 10 thus results in the mainframe, and consequently the nacelle, being moved by means of the fastening portion 12. The holed flange 2 is not altered in this case, and the adjusting means 10 thus pushes off against this holed flange or draws in towards it. The possible movements are represented by the double arrow 14, as a direction of movement 14.

When the gripping portion 8 is not fastened to the holed flange 6 by bolting in one of the drilled holes 6, the indicated direction of movement 14 results in the gripping portion 8 being displaceable on the holed flange 2, this being in the direction of the series of drilled holes 6. The gripping portion 8 can then be bolted in another drilled hole 6.

Figure 3:
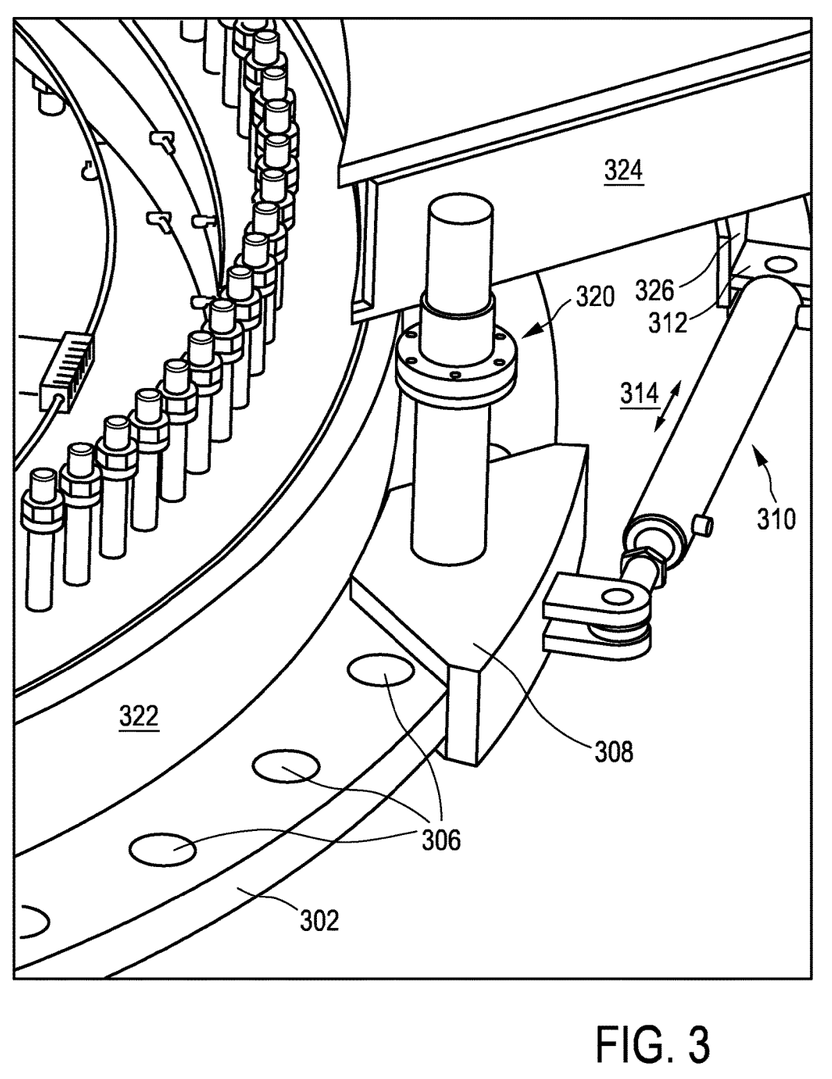
FIG. 3 shows a portion of an adjusting device according to the disclosure, according to a second embodiment, in a perspective representation.

A second embodiment of the holed flange 302, having a gripping portion 308, is illustrated in FIG. 3. The gripping portion 308 comprises a fixing means 320, which can move a fixing pin in the axial direction, in order to introduce such a fixing pin axially into one of the drilled holes 306. The fixing means 320 may also be designated as a bolting unit. From the portion shown in FIG. 3, it can be seen that the holed flange 302 is fastened to a fixed part of the yaw bearing 322. Preferably, for this and other embodiments, a ball-bearing slewing ring is proposed as a yaw bearing. When the gripping portion 308, which may also be designated as a shoe 308, has been bolted to the holed flange 302, i.e., fixed to a drilled hole 6, the linear drive 310 can exert a movement between the gripping portion 308 and the fastening portion 312. As a result, the mainframe 324, of which only a small portion is shown in FIG. 3, is moved relative to the holed flange 2, and therefore also relative to the tower. This movement possibility is indicated by the double arrow 314. For this purpose, the fastening portion 312 is fastened to an anchorage point 326, which is indicated in the region beneath the mainframe 324.

Figure 4:
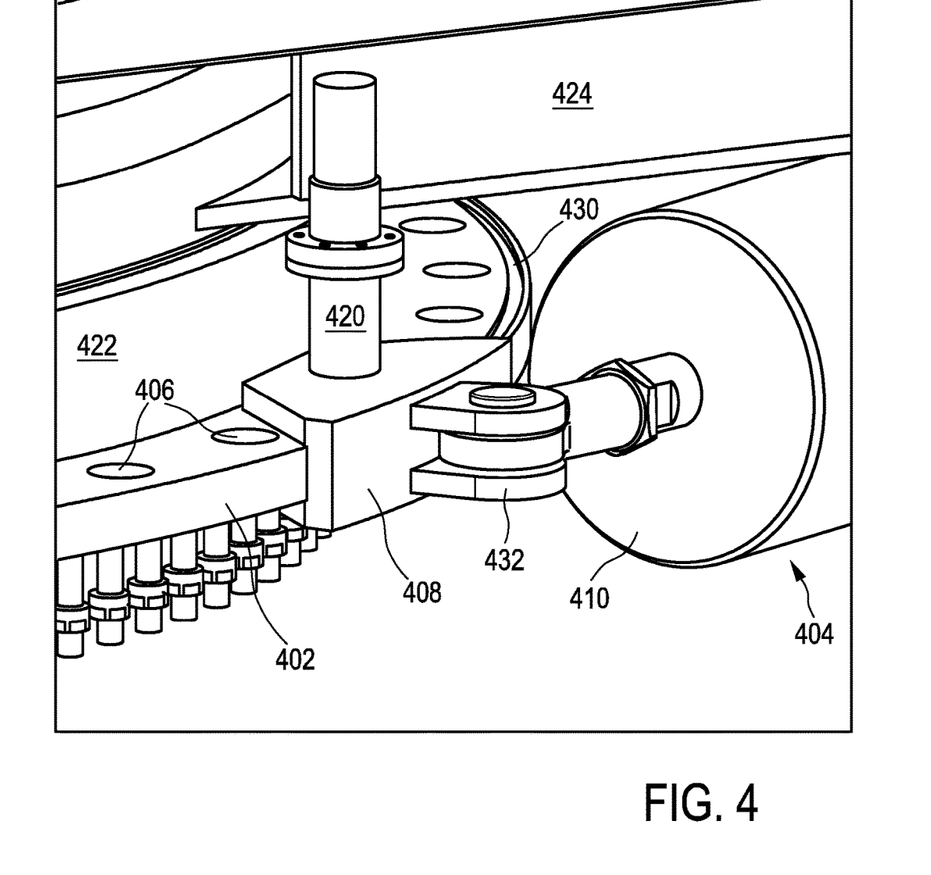
FIG. 4 shows a portion of an adjusting device according to a third embodiment, in a perspective representation.

FIG. 4 shows a further embodiment, in which, likewise, the holed flange 402 is arranged on a fixed part of the yaw bearing 422. The gripping portion 408 grips around the holed flange 402 and can be fixed, by the fixing means 420, to a drilled hole 406 of the holed flange 402. If the gripping portion 408 is not fixed, i.e., if a bolt or a fixing pin of the fixing means 420 is drawn out, the gripping portion 408 can be displaced along the holed flange 402, namely, along the drilled holes 406. For this purpose, it is guided by the full-perimeter groove 430, which thus constitutes a full-perimeter guide portion 430. For this, the gripping portion 408 may have a corresponding projection or guide pin, this not being visible in FIG. 4 because of the perspective.

Otherwise, the adjusting means 404, which is shown only partially here, comprises a linear drive unit 410, which, as in the case of the other embodiments shown, is coupled to the gripping portion 408, or to the shoe 408, via a link joint 432. Actuation of the linear drive 410 results in a movement, namely, a swivel movement, of the mainframe 424, of which, likewise, only a portion is shown here.

The essential difference between the embodiments of FIG. 3 and FIG. 4 would have to be the diameter of the linear drive.

Figure 5:
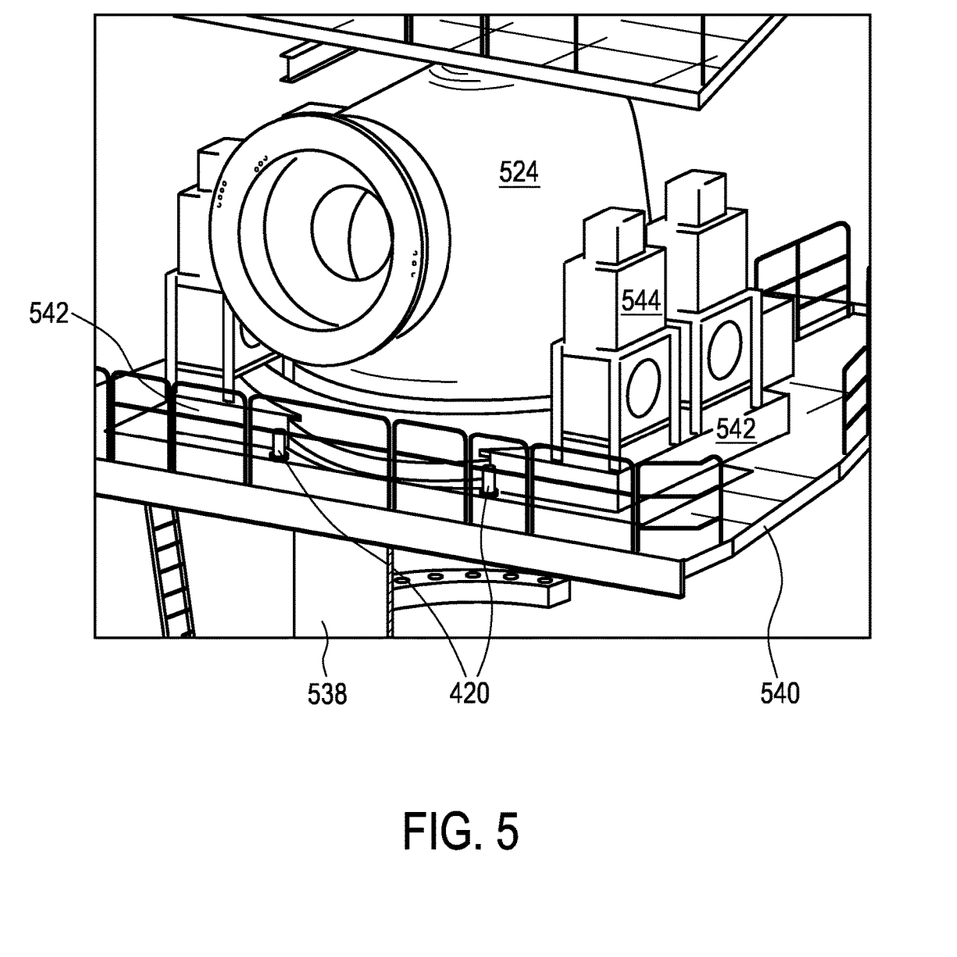
FIG. 5 shows, schematically and in a perspective representation, a part of a nacelle of a wind turbine having an adjusting device according to the third embodiment.

The perspective representation of a portion of a nacelle tier of a nacelle of a wind turbine according to FIG. 5 illustrates a saving of space achieved by the proposed disclosure. Shown in FIG. 5 is a mainframe 524, which is designed to carry the generator, together with the rotor, on the generator flange 536 shown. Also shown, in partial section, is a tower portion 538, on which the mainframe 524 is rotatably mounted. Surrounding the mainframe 524 is a lower nacelle platform 540, on which switchgear cabinets 544 are indicated, on a yaw podium 542. Previous yaw adjustments by means of various electrical yaw drives, which each engage, by means of a pinion, on a common internal ring gear, have required these two yaw podiums 542 for the various yaw drives. The use of the proposed adjusting means together with the holed flange has thus created this space as additional space. In this respect, of the adjusting device now proposed, only a part of two fixing means 420 can be seen in FIG. 5. The adjusting device has thus additionally become highly space-efficient.

Figure 6:
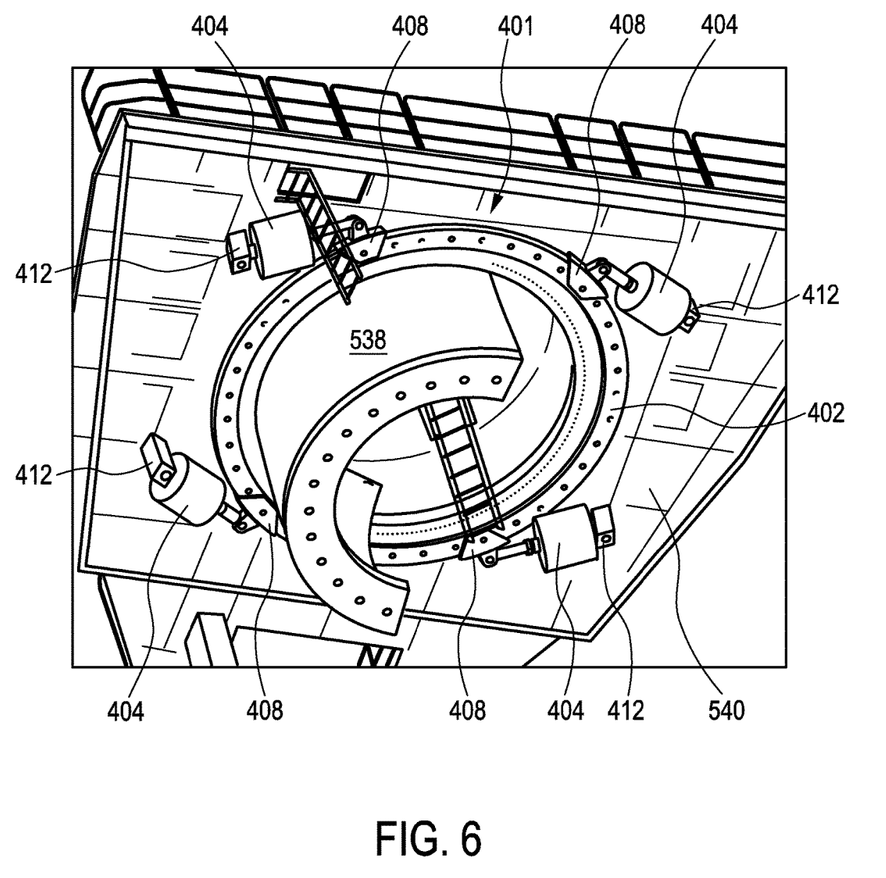
FIG. 6 shows a portion of a nacelle according to FIG. 5, in a perspective view from below.

FIG. 6 shows the nacelle platform 540 in a perspective from below, such that substantially more details of the adjusting device 401 are also visible. The four adjusting means 404 may be arranged beneath the nacelle platform 540, but in the nacelle or within a nacelle casing, and therefore occupy practically no relevant space. They may be fastened to the mainframe by means of their fastening portions 412, and grip on the holed flange 402 from the outside by means of their gripping portions 408. Any interior in the tower 538, which is represented here only as a partial section, to aid illustration, remains free because of the proposed adjusting device 401.

Preferably, the holed flange may be mounted as a disc, or as a ring, between a bearing and a tower flange. As a result, it may also be possible to use a smaller yaw bearing than is otherwise used for a construction of the same size.

To be described in the following are some additional aspects and advantages for the present disclosure, which is not limited to the embodiments. The proposed solution makes it possible to create a yaw adjustment without additional brakes and without a tooth system.

In particular, tooth wear, or even broken teeth, can be avoided as a result. Such problems may necessitate a high resource input for repair. It may be the case that the entire nacelle has to be demounted, because individual teeth of a ring gear cannot be replaced, and instead the entire ring gear would have to be replaced.

The proposed solution, which proposes, even if not imperatively, the use of hydraulic cylinders, makes it possible to provide a ball-bearing slewing ring with holes, i.e., drilled holes instead of teeth. This provides for simple machining. A ball joint may be provided between the linear drive and the gripping portion. Normal material, in particular non-hardened steel, may be provided, at least for the holed flange. If necessary, the drilled holes in this case may be reinforced with a hardened sleeve. In comparison with known solutions, it is also possible to achieve a reduction in the parts required, thereby reducing, in particular, the amount of maintenance required.

A gripping portion, or shoe, is thus arranged on a hydraulically retractable and extendable bolt of the hydraulic cylinder, or it would also be possible to use an electric cylinder instead of a hydraulic system. This shoe is connected to the hydraulic cylinder, and the hydraulic cylinder, in turn, is connected to the mainframe, or yaw frame. Preferably, four hydraulic cylinders, i.e., four positioning means, are provided, in order that two can always be in engagement.

Thus, there are always two cylinders advancing the system, i.e., the nacelle, and for example a 9° displacement per cylinder stroke may be provided.

When the cylinders have reached their end position, they stop there. The other two cylinders are then bolted into the respectively next holes, i.e., fixed there by means of fixing pins, and the first two cylinders that have just advanced the system are then unbolted, i.e., released from the drilled holes. Remaining with this example, the second two cylinders then accordingly effect the next 9° yaw adjustment. The respective gripping portions may be advanced by a plurality of drilled holes, or the drilled holes may be provided so closely together that, for the maximum displacement, being 9° in the said example, there are a plurality of drilled holes available, thus affording flexibility.

The arrangement of the adjusting means on, in or beneath the nacelle avoids transfer points at which hydraulic fluid has to be transferred via hydraulic rotary connections. Nevertheless, the proposed system could also be used for a pitch adjustment, or even for adjusting, or at least arresting, the rotor of the generator.

For the proposed yaw adjustment, however, such rotary connections are not even necessary, and the hydraulic lines can be laid in a fixed manner, i.e., realized by fixed pipelines. It is also advantageous that the use of four adjusting means, with only two adjusting means being engagement in each case, requires at least less synchronization effort, as compared with the use of eight or twelve electric adjusting motors.

Otherwise, the adjusting device can also act and be constructed such that it grips on the tower flange by means of its shoes, or gripping portions.

The invention claimed is:

1. An adjusting device for adjusting a yaw position of a nacelle of a wind turbine, the adjusting device comprising:
   a circumferential holed flange having holes, and
   at least one adjusting means having:
      a gripping portion for gripping to the holed flange,
      a fastening portion for fastening to an anchorage point of the wind turbine, and
      a linear drive for exerting a linear movement between the gripping portion and the fastening portion,
   wherein the holed flange is fixedly coupled to the nacelle and the anchorage point is fixedly coupled to a stationary part of the wind turbine or vice versa, wherein the nacelle is mounted so as to be rotatable relative to the stationary part of the wind turbine such that the holed flange and the anchorage point also execute a rotational movement relative to each other,
   wherein the linear movement exerted between the gripping portion and the fastening portion by the linear drive effects the rotational movement between the holed flange and the anchorage point and thereby effects a yaw adjustment of the nacelle,
   wherein the gripping portion has at least one movable fixing pin for engaging in respectively one of the holes of the holed flange, in order thereby to fix the gripping portion to the holed flange in a releasable manner.

2. The adjusting device according to claim 1, wherein:
   the linear drive is a hydraulic linear drive.

3. The adjusting device according to claim 2, wherein:
   the hydraulic linear drive is controlled by control valves that allow hydraulic fluid to be supplied to or drawn from a hydraulic cylinder, in order thereby to effect the linear movement between the gripping portion and the fastening portion, wherein closing of the control valves suppresses the linear movement, and as a result the nacelle is held in its current yaw position.

4. The adjusting device according to claim 1, wherein:
   the holed flange has a full-perimeter guide portion, and
   the gripping portion has a running portion matched to the full-perimeter guide portion of the holed flange to guide the gripping portion by the running portion on the full-perimeter guide portion.

5. The adjusting device according to claim 4, wherein the full-perimeter guide portion includes a rail, a groove, and a projection that extend around a perimeter of the holed flange.

6. The adjusting device according to claim 1, wherein:
   the holes of the holed flange are lined with hardened sleeves that reduce wear on material delimiting the holes.

7. The adjusting device according to claim 1, wherein:
   the linear drive includes a damping system.

8. The adjusting device according to claim 7, wherein the linear drive is a hydraulic linear drive, wherein the hydraulic linear drive has a bypass opening that provides a diversion possibility for hydraulic fluid to reach the damping system.

9. The adjusting device according to claim 1, wherein:
   the at least one adjusting means includes a first pair of adjusting means fixed with their gripping portions on the holed flange shifted with their gripping portions from one hole position to another.

10. The adjusting device according to claim 1, wherein:
    upon the nacelle obtaining a new yaw adjustment, the linear drive is configured to build up a tension, in order thereby to avoid a play or a clearance between the holed flange and the anchorage point.

11. The adjusting device according to claim 1, wherein:
    for each adjusting means there is a measuring means for effecting a longitudinal measurement of an adjusting cylinder of the adjusting means for the purpose of positioning the gripping portion of the adjusting means to find a drilled hole of the holed flange.

12. The adjusting device according to claim 1, wherein:
    the holes of the holed flange and the positions of the holes are identified to determine the current yaw position of the nacelle.

13. The adjusting device according to claim 1, comprising:
    an information connection for transmitting information between the adjusting means and a central control unit to coordinate the movement of the adjusting means.

14. The adjusting device according to claim 1, wherein:
    each gripping portion has at least two fixing pins for engaging in two holes.

15. The adjusting device according to claim 1, wherein:
    the gripping portion grips around an outer perimeter of the holed flange, is arranged so as to be displaceable along an outer perimeter.

16. A wind turbine, comprising:
    a tower; and
    a wind turbine nacelle mounted in a rotatable manner on the tower by a yaw bearing, wherein, for the purpose of adjusting a yaw position of the nacelle, an adjusting device according to claim 1 is provided.

17. The wind turbine according to claim 16, wherein:
    the holed flange is fastened to at least one of a tower shaft of the tower and the yaw bearing and extends radially outward therefrom, wherein the holes of the holed flange are arranged radially outwardly in relation to at least one of the tower and the yaw bearing, wherein the yaw bearing is a ball-bearing slewing ring.

18. An adjusting means prepared for use in an adjusting device according to claim 1.

19. A method for adjusting a yaw position of a nacelle of a wind turbine by an adjusting device according to claim 1, wherein the at least one adjusting means includes first and second adjusting means, the method comprising the steps:
    a) actuating a first adjusting means that is engaged with the holed flange, such that a first rotational movement occurs between the holed flange and the anchorage point, and consequently a first yaw adjustment of the nacelle,
    b) shifting a second adjusting means from a first hole to a second hole of the holed flange,
    c) actuating the second adjusting means that is now in engagement with the holed flange, such that a second rotational movement occurs between the holed flange and the anchorage point, and consequently a second yaw adjustment of the nacelle, and
    d) shifting the first adjusting means from a third hole into a fourth hole of the holed flange.

20. The method according to claim 19, wherein:
    the linear drive, is operated, at least upon attaining a new, desired yaw position, such that it builds up a tension, in order thereby to avoid at least one of a play and a clearance between the holed flange and the anchorage point.

21. The adjusting device according to claim 2, wherein the linear drive is self-locking, and suppression of the linear movement is effected by the self-locking.

\* \* \* \* \*